(12) United States Patent
Russell, II et al.

(10) Patent No.: US 7,366,273 B2
(45) Date of Patent: Apr. 29, 2008

(54) METHOD OF DETERMINING MARGINS TO OPERATING LIMITS FOR NUCLEAR REACTOR OPERATION

(75) Inventors: William Earl Russell, II, Wilmington, NC (US); Russell Morgan Fawcett, Atkinson, NC (US); William Charles Cline, Wilmington, NC (US); David Joseph Kropaczek, Wilmington, NC (US); Glen A. Watford, Wilmington, NC (US); Lukas Trosman, Wilmington, NC (US); Steven Barry Sutton, Wilmington, NC (US); Christian Carlos Oyarzun, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 11/320,919

(22) Filed: Dec. 30, 2005

(65) Prior Publication Data

US 2007/0153958 A1    Jul. 5, 2007

(51) Int. Cl.
*G21C 7/36* (2006.01)
(52) U.S. Cl. .................... 376/216; 376/259; 376/215
(58) Field of Classification Search ................ 376/216, 376/259, 215
See application file for complete search history.

(56) References Cited

U.S. PATENT DOCUMENTS

| | | | |
|---|---|---|---|
| 5,912,933 A * | 6/1999 | Shaug et al. | 376/216 |
| 6,674,825 B2 * | 1/2004 | Bolger et al. | 376/216 |
| 7,200,541 B2 * | 4/2007 | Kropaczek et al. | 703/13 |

* cited by examiner

*Primary Examiner*—Ricardo J. Palabrica
(74) *Attorney, Agent, or Firm*—Harness, Dickey & Pierce, PLC (57) ABSTRACT

In a method of determining an operating margin to a given operating limit in a nuclear reactor, operational plant data from an on-line nuclear reactor plant is accessed, and reactor operation is simulated off-line using the operational plant data to generate predicted dependent variable data representative of the given operating limit. The predicted dependent variable data is normalized for evaluation with normalized historical dependent variable data from stored operating cycles of plants having a similar plant configuration to the on-line plant. A time-dependent average bias and a time-dependent uncertainty value for the predicted dependent variable data are determined using the normalized historical dependent variable data, and a risk-tolerance level for the on-line plant is obtained. An operating margin to the given operating limit is determined based on the determined time time-dependent average bias value and time-dependent uncertainty value so as to satisfy the risk-tolerance level of the evaluated plant.

12 Claims, 6 Drawing Sheets

METHOD OF DETERMINING MARGINS TO OPERATING LIMITS FOR NUCLEAR REACTOR OPERATION

BACKGROUND OF THE INVENTION

1. Field of the Invention

The present invention relates generally to design and operation of nuclear reactors, and more particularly to a method of determining a margin to an operating limit of a nuclear reactor.

2. Description of the Related Art

During the operation of a boiling water reactor (BWR) or pressurized water reactor (PWR), a continuous monitoring of all operating parameters and resulting thermal limits is performed. For example, percent rated power, percent rated flow, inlet moderator temperature, core pressure, and any positioning of control blades are monitored in order to identify the instantaneous status of the reactor. Also, instrumentation within the reactor core helps monitor reactivity, which maps to corresponding operating responses in parameters such as critical power ratio (CPR), Maximum Average Planar Linear Heat Generation Rate (MAPLHGR), and Maximum Fraction of Linear Power Density (MFLPD), each of which represents a core safety thermal limit on nuclear fuel and which may also be referred to as power-related limits on nuclear fuel. These measured thermal responses are compared to their corresponding operating limits to provide the current margin to the operating limits. The continuous monitoring of core parameters and corresponding margins to operating limits is done throughout the core energy cycle. A computer which performs this monitoring is called a "process computer". At a minimum, snapshots of the reactor status and resulting margins to operating limits such as the thermal limits above and/or operating limits are processed once per day and stored, typically as an electronic ASCII file.

In order to maintain models of the reactor for use in projection work, development of subsequent design cycles, and/or to provide support for current operating issues, designers or plant operators maintain an off-line (not on the process computer) three dimensional (3-D) simulation of the reactor that resembles the actual operation of the given cycle in the actual reactor core. There are typically differences between the thermal and reactivity margins determined by the process computer (measured margins to operating limits) and those predicted by the off-line model (predicted margins). These differences are caused by a variety of factors, including inadequacies in simulator models, imperfect modeling of the actual plant operation, uncertainties in operating parameters, uncertainties in tip measurements, etc., as well as other unknown uncertainties. Differences between the on-line and off-line margins (i.e., to thermal, reactivity and/or power-related operating limits) determinations force plant operators to require additional margin to these operating limits, so as to insure trouble free operation. Additional margin can be obtained by making changes to the operational parameters, and/or by selection and positioning of different rod patterns. However, the cost of such changes typically is a loss of power or fuel cycle efficiency. Moreover, a "larger than needed" margin requirement has an adverse economic impact on the plant.

The determination of sufficient operating limit margins and predicted trends for expected operating limits and uncertainty exposure dependent biases is a complex problem for design and operation of a nuclear reactor. From the time of the first nuclear reactor it has been observed that the predicted results from computer models and the observed reality (actual operating limits as determined from on-line operation) can oft-times be significantly different for these important dependent variables (i.e., operating limits). To protect against these differences, engineers have developed standard design margins or historical design margins that are to be used to account for or "cover" these differences.

However, these standard design margins are crude at best. Sometimes, the historical required design margin is inadequate, resulting in manipulation of control rods during operation in order to regain lost margin. If rod pattern changes do not alleviate or correct the problem, plants have been even known to have to de-rate (lower power production). Either solution is extremely costly to the fuel cycle efficiency and can cost millions of dollars in lost revenue. Additionally, the historical design margin is occasionally inappropriately conservative, thereby resulting in a reduction in possible fuel cycle efficiency.

BRIEF DESCRIPTION OF THE INVENTION

An exemplary embodiment of the present invention is directed to a method of determining an operating margin to a given operating limit in a nuclear reactor. Operational plant data is accessed during a current operating cycle from an on-line nuclear reactor plant to be evaluated, and reactor operation is simulated off-line using the operational plant data to generate simulation results including predicted dependent variable data representative of the given operating limit. The predicted dependent variable data from the simulation results is normalized for evaluation with normalized historical dependent variable data from each of a plurality of stored operating cycles of nuclear reactor plants having a similar plant configuration to the plant being evaluated. A time-dependent average bias and a time-dependent uncertainty value for the predicted dependent variable data is determined using the normalized historical dependent variable data, and a risk-tolerance level for the plant being evaluated is obtained. An operating margin to the given operating limit is determined based on the determined time-dependent average bias value and time-dependent uncertainty value, so as to satisfy the risk-tolerance level of the evaluated plant.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE INVENTION

Figure 1:
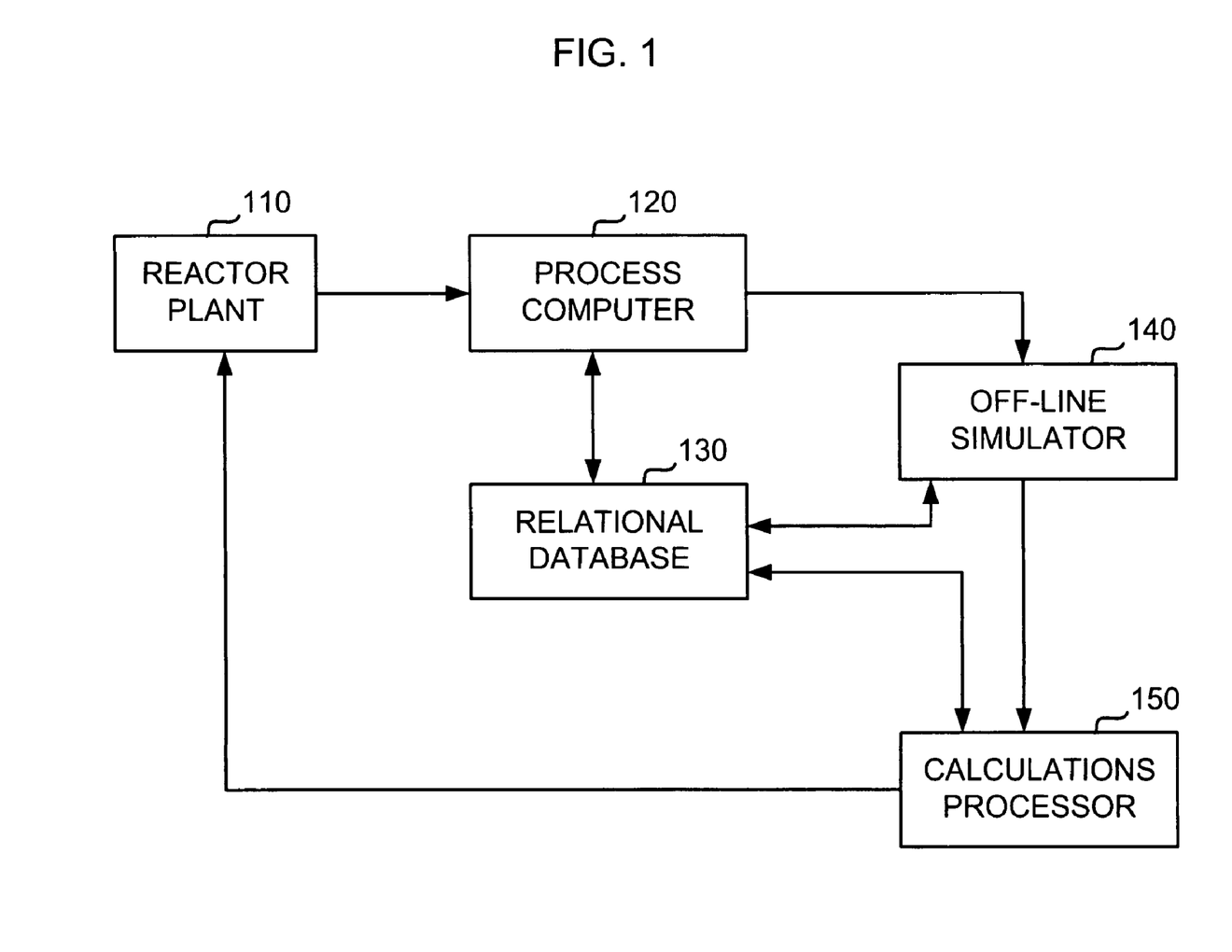
FIG. 1 is a block diagram of an example arrangement for data gathering and calculations associated with the exemplary methodology described herein.

FIG. 1 is a block diagram of an example arrangement for data gathering and calculations associated with the exemplary methodology described herein. In general, and as to be discussed in more detail below, a process computer 120 is used to access plant operational data, including margins to operating limits from an on-line and operating reactor plant 110. This data may be stored as an ASCII file as discussed above, but in an alternative embodiment may be directly stored in a database 130 (on-site or off-site) in operative communication with process computer 120.

The process computer 120 is well-known in the art and may be embodied as any system, device, or computer that monitors plant operation and provides information related to the instantaneous performance of an operating nuclear reactor. Database 130 may be a relational database such as an Oracle 8i Alpha ES 40 relational database server. Database 130 may contain a number of subordinate databases that handle all the necessary data and results in order to implement the example method of the present invention.

The operational data may be used to model the on-line reactor plant being evaluated, matching the operating parameters at the current exposure in cycle, so as to execute an off-line simulation at off-line simulator 140. The off-line simulator may be well-known executable 3D simulator program such as PANACEA, LOGOS, SIMULATE, POLCA, or any other known simulator software where the appropriate simulator drivers have been defined and coded, as is known.

The simulation provides results including predicted margins to given operating limits, which hereafter may be referred to as "predicted dependent variable data". The predicted dependent variable data may be stored in database 130, and is also provided to a calculation processor 150, which is to be used for determining a revised operating margin to a given operating limit. Processor 150 may be any processor capable of performing relatively complex calculations. Any PC or laptop driven by a Pentium-based microprocessor chip or an equivalent processing entity may suffice as a calculation processor 150. The calculations performed by processor 150 are to be described in further detail hereafter.

Once the margin value has been calculated, this data may be used by processor 150 to determine revised operating parameters for the on-line plant being evaluated, and may be communicated to plant operators at plant 110 so as to change operating parameters (i.e., control rod sequence, core flow, power level, etc.) at the current exposure (time in operating or energy cycle) or at a future point in the current operating cycle of the plant 110. These margin calculations may be performed continuously at any desired frequency or periodicity, in an effort to maximize plant 110 efficiency, for example.

As shown in FIG. 1, data flow between process computer 120, off-line simulator 140 and processor 150 may be two way with database 130 so that calculations or results may be continuously stored, and/or so that data may be accessed from database 130.

Figure 2:
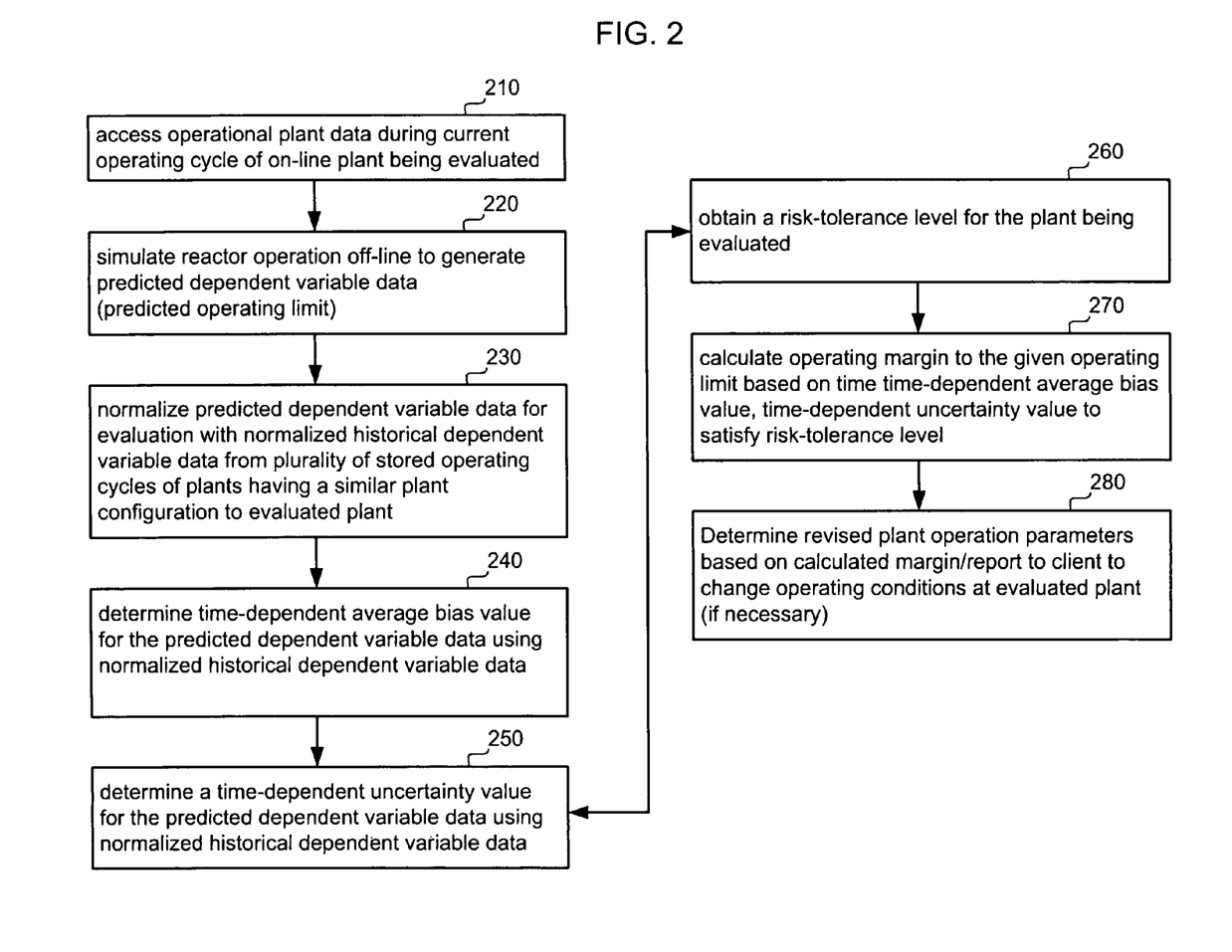
FIG. 2 is a process flow diagram to explain the example method of determining an operating margin to a given operating limit.

FIG. 2 is a process flow diagram to explain an example method of determining an operating margin to a given operating limit. Occasional reference may be made to FIG. 1 for the following discussion. During the operation of plant 110, operating conditions and monitored parameters are accessed (210) during a current operating cycle from plant 110 by the process computer 120 and saved to database 130.

The independent variables (i.e., rod pattern, operating conditions such as reactor power and core flow, plant configuration, mechanical conditions, core conditions, enrichment and gadolinium properties, cycle exposure, etc.) may also be saved to database 130 in order to correlate any potential trends between simulation biases and core configuration. Similarly, all monitored results or dependent variable data such as Maximum Fraction of Limiting CPR (MFLCPR), MFLPD, MAPLHGR, cold shutdown margin, reactivity-related parameters (such as Hot Eigenvalue, etc.), and predicted margins to these operating limits are also saved to database 130. MFLCPR is a power-related fuel limit. MFLCPR measures the allowable margin between operating conditions and a limit to 'dryout', where coolant in the core can no longer remove heat at a sufficient rate, such that fuel and clad temperatures start to increase rapidly. This boiling transition phenomenon, which can lead to a temperature excursion in BWR fuel, is referred to as dryout.

Accordingly, plant operating conditions that are retrieved by the process computer 120 may be understood as independent variables, and monitored or measured operating limit data (thermal and power-related limits and margins thereto) retrieved by the process computer 120 is actual dependent variable data. These independent and dependent variables from one or more exposure points in the current operating cycle may thus be saved or stored in database 130.

With the above information saved to the database 130, a reactor simulation input file can be created or prepared. The simulation input file uses identical independent variables as described above and may be stored in an electronic file format (i.e., ASCII) that is recognized by the identified core simulation software program (off-line simulator 140). Once the input file is prepared, the off-line simulator 140 executes its program to simulate reactor operation of plant 110 off-line and to generate a prediction of the dependent variables, referred to as predicted dependent variable data. The predicted dependent variable data may be understood as a nominal estimate of future results, and therefore may be used to calculate a nominal estimate of operating margins, but does not take into account any uncertainty for the predictions.

Figure 6:
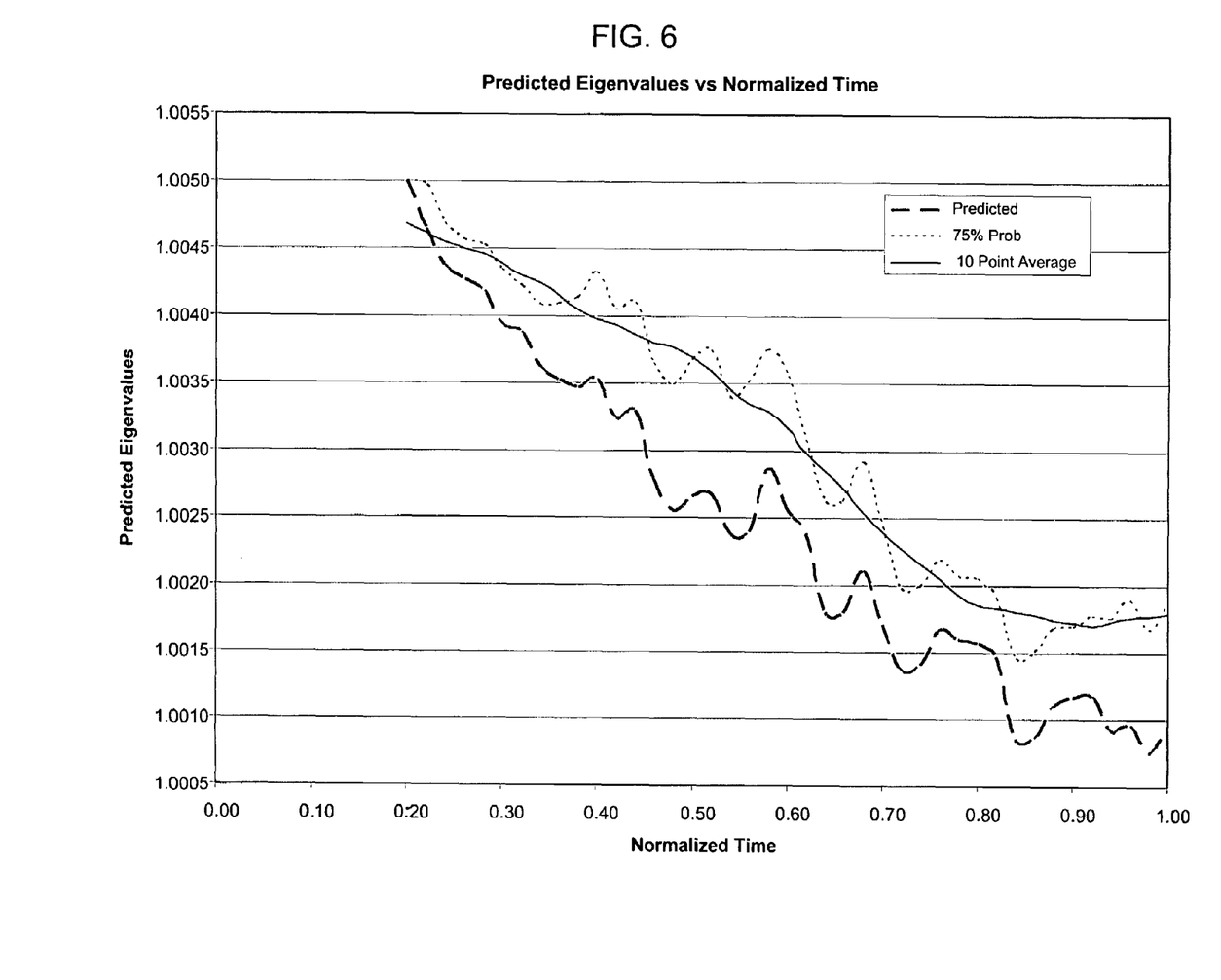
FIG. 6 is a graph of predicted eigenvalue versus normalized time to illustrate differences in the predicted margin as a result of off-line simulator predictions as determined by the example methodology herein.

FIG. 6 is a graph of predicted eigenvalue versus normalized time to illustrate differences in the predicted margin as a result of simulation and the margin as determined by the example methodology herein.

Ideally, the off-line simulated dependent variables (predicted margins to limits such as MFLCPR, MFLPD, MAPLHGR, etc.) and the measured or actual dependent variable data (actual margins to MFLCPR, MFLPD, MAPLHGR, etc.) from plant operation would be identical. However, due to several (or more) of the factors identified above, these typically are not. At this time, the predicted dependent variable data is normalized (230) with respect to time (exposure) relative to anticipated EOC (End of Cycle). In other words, the data is normalized by processor 150 on a BOC (Beginning of Cycle) to EOC time range of 0.0 (BOC) to 1.0 (EOC). In doing so, the normalized predicted dependent variable data can be evaluated with results (such as normalized historical dependent variable data) from many reactor simulations of other plant cycles, with the normalized data being stored in database 130.

Database 130 contains a substantial collection of reactor simulations, and hence, includes a substantial amount of historical dependent variable data from reactor simulations of operating cycles in other reactor plants. For example, because the assignee has provided fuel and engineering services for approximately 30 BWR's over approximately 20 years, almost 400 complete exposure depletion cycles are available (given an approximate 1 ½ year average cycle length). A collection of data for 400 operating cycles is a significant collection of information for evaluating operation of nuclear reactors. This information can be utilized by the example methodology of the present invention and for the resulting predictions therefrom. For example, as part of step 230, the processor 150 retrieves historical simulation data from plants having a similar plant configuration to plant 110. This historical dependent variable data is also normalized with respect to time on the 0.0 to 1.0 scale for evaluation, although any other normalized scale could be employed, as would be evident to one of skill in the art.

While all of this data has been normalized with respect to time (exposure) so that all data ranges from 0 to 1 (0.0=BOC, 1.0=EOC), it is recognized that some of the operating strategies for the various stored operating cycles are dissimilar. Consequently, it may be desirable to filter the larger collection of cycle data in database 130 to collect a sub-set of data that is most similar in plant operation style to the specific plant 110 being evaluated. Filtering parameters may include, but are not limited to: cycle length, power density, average gadolinia concentration, flow strategies, loading strategies, etc. Thus, the filtered historical data incorporates data from similar plant operation styles. As a result of the above filtering process, predicted uncertainties may become smaller, and may be used to improve fuel cycle efficiency.

Similarly, it may also be desirable to provide correlation to the above continuous variables by way of least squares, neural networks, or any other trend capturing mathematics. In doing so, a larger set of data can be incorporated and global trends may be included, possibly resulting in a further reduction in predicted uncertainties, and may be used to improve fuel cycle efficiency.

Figure 3:
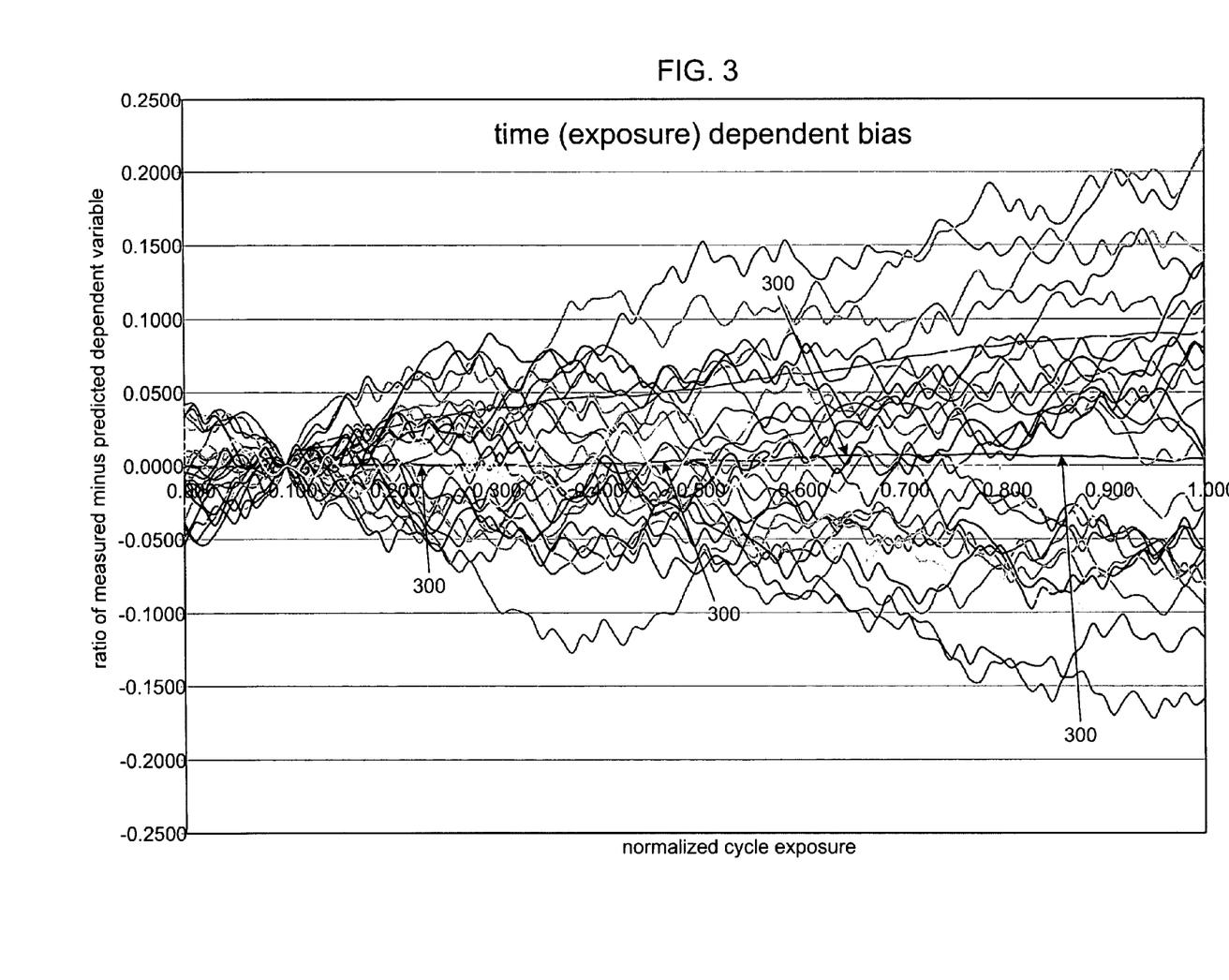
FIG. 3 is a graph of calibrated time-dependent bias versus normalized time to explain the calculation of the time-dependent average bias value in accordance with the example method.
Figure 4:
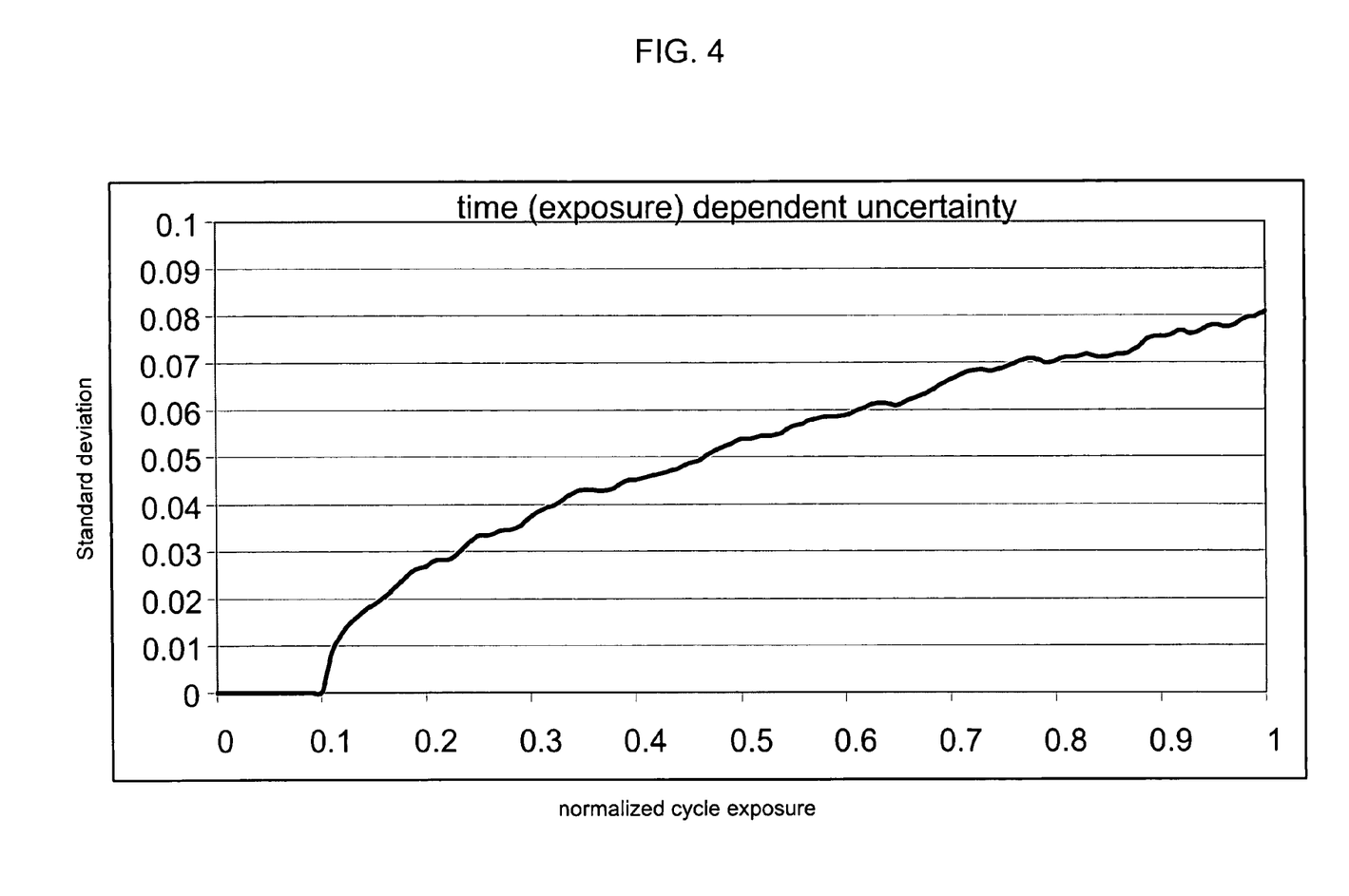
FIG. 4 is a graph of time-dependent uncertainty versus normalized time to explain the calculation of the time-dependent uncertainty value in accordance with the example method.

FIG. 3 is a graph of calibrated time-dependent bias for a given operating limit versus normalized time to explain the calculation of a time-dependent average bias value in accordance with the example method. FIG. 4 is a graph of time-dependent uncertainty versus normalized time to explain the calculation of the time-dependent uncertainty value in accordance with the example method.

In general, the normalized historical dependent variable data will be used by processor 150 in order to calculate a time-dependent average bias value that will provide a predicted expected bias at all future times in the cycle for the predicted dependent variable data (such as a given margin to a given operating limit) calculated as a result of the off-line simulation of plant 110. In FIG. 3, there are shown time-dependent bias curves for 30 identified operating cycles of plants having a similar plant configuration to plant 110. This information is retrieved from database 130 by processor 150. For each historical cycle being evaluated, a bias value for the historical dependent variable data is known and has been calculated in advance (and stored in database 130). The known bias value at a given exposure point, for a given stored historical operating cycle, represents a difference between the measured and the predicted operating limit at that exposure point for the given historical cycle.

Once the selected data has been collected for all 30 cycles between 0.0 to 1.0 (the data here being the known bias values along all exposure points for each of the historical dependent variable data of each historical operating cycle), the data is calibrated relative to the current time in operation of the operating cycle of plant 110 being evaluated, e.g., the point in cycle time being evaluated.

For example, and referring to FIG. 3, if cycle operation of plant 110 is approximately 10% complete (t=0.10), all data (all bias values) at all time intervals should be calibrated upwards or downwards until the value at t=0.10 is set to zero on the y-axis (ratio of measured minus predicted dependent variable). Calibrations to bias values after t=0.10 would be adjusted to correct for the calibration. FIG. 3 illustrates how the multiple curves (30 curves) are calibrated at t=0.10. Whereas the above example identifies calibration by way of addition-subtraction to set values to zero at t=0.10, calibration can also be performed using multiplication-division to set values to one at t=0.10. Calibration by way of addition-subtraction or multiplication-division may be selected by the mathematical processes which provide the smallest prediction of future uncertainty.

As can be seen from FIG. 3, all lines go through zero at t=0.10. This is because at any given current time (t=0.10 in this example) there is a known exact bias between the off-line simulation results (predicted margin) and operating plant-measured result (actual margin to the given operating limit). From the calibrated curves, two time-dependent curves are determined. First, the time (exposure) dependent bias value is determined (240) by averaging all of the future data (t>0.10). In the above example, the data is somewhat random and the time dependent bias for all future times is approximately 0.0. In FIG. 3 this time dependent bias value is shown as curve 300, which is the average of the bias values of the 30 curves at each evaluated exposure point between t=0.1 (current time) and t=1.0 (future time).

Accordingly, to calculate the time dependent bias value (curve 300), the normalized historical dependent variable data is calibrated to force the known bias values to the current exposure point in the operating cycle of plant 110. The time-dependent average bias value is this determined by averaging all the bias values of the normalized historical dependent variable data at each of the exposure points, as calibrated from the current exposure point in plant 110 being evaluated.

Next, and as shown in FIG. 4, a time (exposure) dependent uncertainty is determined (250). This is determined by calculating the standard deviation at all times greater than the present time (in this example, all times greater than t=0.10). An example of a time dependent uncertainty curve is shown in FIG. 4. The curve in FIG. 4 represents the standard deviation at each exposure point of the time-dependent bias curve 300 in FIG. 3. In FIG. 4, it can be seen that the generally parabolic shape of the curve indicates that the uncertainty in the bias value goes up over time. Thus, if the designer knows where he is at any point in the cycle (past or present), such as at t=0.2, the curve can be used to predict the uncertainty in the bias value for the predicted dependent variable data at any other future time in the cycle.

An observation can be made by studying the curves in FIGS. 3 and 4 in greater detail. There is an exact and simple correlation that relates all of the uncertainties, represented as "$\sigma$", of a random system to time. If the uncertainty $\sigma$ of the system is known at any point (example t=ref), the uncertainty a of any other point can be calculated by the following set of equations in (1):

$$\sigma_{target} = \sigma_{ref}[t_{target}/t_{ref}]^{1/2} \text{ or rewritten as,}$$

$$\sigma^2_{target}t_{ref} = \sigma^2_{ref}t_{target} \text{ or rewritten as,}$$

$$\sigma^2_{target}/\sigma^2_{ref} = t_{target}/t_{ref} \quad (1)$$

The last equation of (1) illustrates the relation used to determine required future dependent variable uncertainties for a modeled independent variable measured-to-predicted system, In (1), $t_{target}$=desired time of desired uncertainty, $t_{ref}$=reference time where uncertainty of system is known, $\sigma_{ref}$=reference uncertainty at reference time ($t_{ref}$) and $\sigma_{target}$=desired uncertainty at desired time ($t_{target}$). As shown by the last equation of (1), relative time therefore equals relative uncertainty and relative uncertainty equals relative time. Therefore utilization of this relation can provide a determination of future uncertainties. Consequently, given the amount of future time that is required (i.e. the next control blade sequence interval) and data from a reference time, a good estimate of the required future uncertainty can be determined. The combination of this information can provide maximum fuel cycle efficiency while simultaneously providing event-free operation.

Extensive computer experiments have been performed to confirm that expression (1) is exact as the number of uncertainty curves for nuclear reactors increase to infinity.

Figure 5:
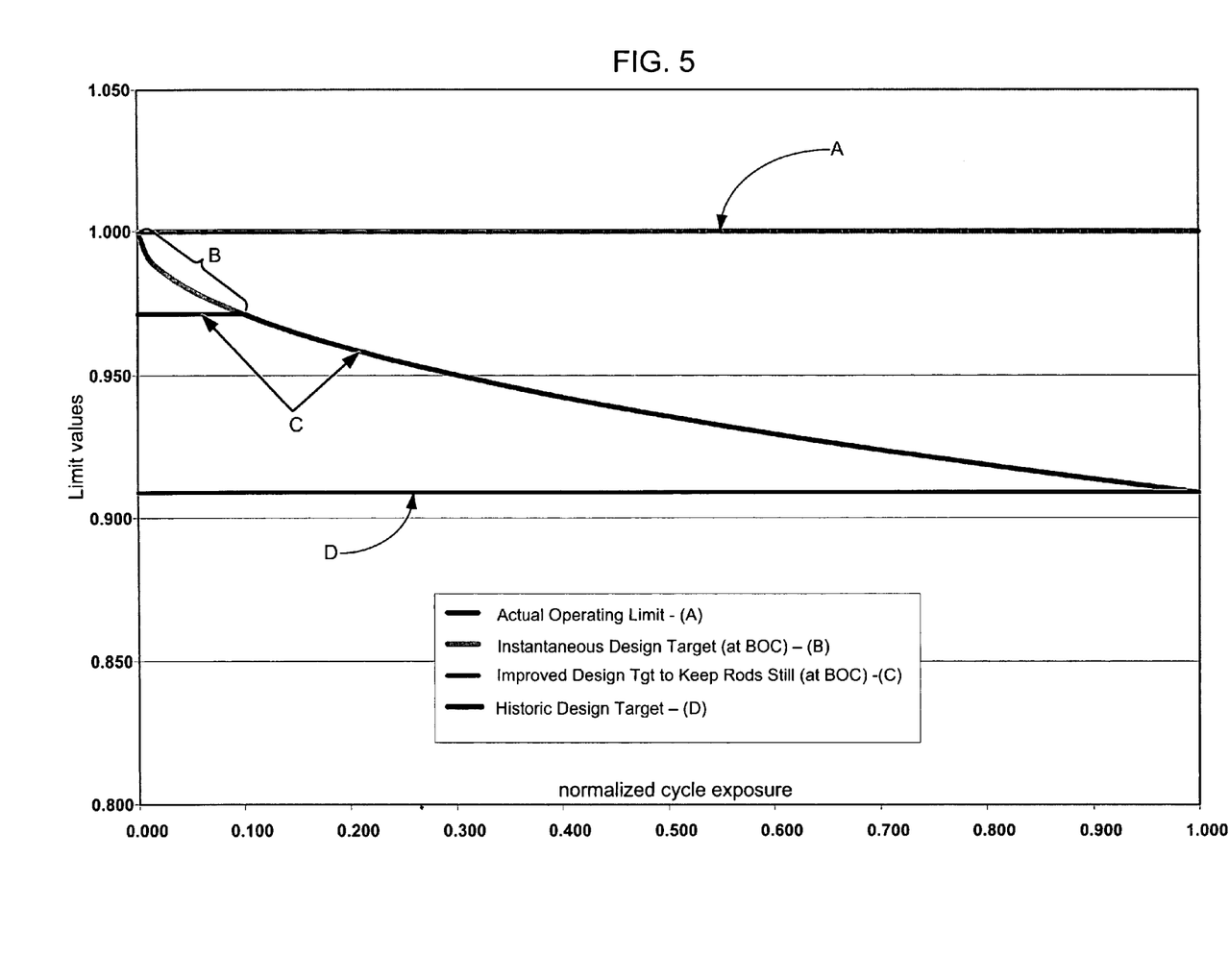
FIG. 5 is a graph to assist explanation of how a margin for a given operating limit is calculated based on the time-dependent bias value and time-dependent uncertainty value so as to satisfy a risk-tolerance level set for the plant being evaluated.

FIG. 5 is a graph to assist explanation of how a margin for a given operating limit is calculated based on the time-dependent bias value and time-dependent uncertainty value so as to satisfy a risk-tolerance level set for the plant being evaluated. Now that a time dependent bias (240) and a time dependent uncertainty (250) has been determined, this information can be used to determine a required or revised margin to the given operating limit (270). This calculation is based on obtaining a risk-tolerance level 260 for the plant 110. The risk-tolerance level may be understood as a desired predictability of meeting the operating limits of a customer's reactor plant, or in other word, a probability of an event not occurring in plant 110 during a given period in the current operating cycle. For example if the number of historical data points is large (such as greater than 30) and the customer wanted a given probability (i.e. 90%, 95%, 99%, 99.9%, etc) of operating their nuclear reactor with fixed rod patterns for the first sequence of cycle operation, the following margin in FIG. 5 would be required. Where a smaller set of historical data points is used or specific confidence levels are required, multiplier constants known as probability K values should use appropriate confidence corrections.

In FIG. 5 (t=0), curve A represents the actual operating limit of any required thermal or power-related result (MFLCPR, MFLPD, MAPLHGR, etc). This is a line that should not be exceeded during the operation of the plant 110. The curve B represents the needed design target to make sure the operating limit is not violated at any future time. If the customer wanted to make sure that a first sequence of operation (t=0 to t=0.1) would not require any rod pattern modification, they would utilize the required margin prediction at t=0.1.

In FIG. 5, a design target operating limit of 0.971 would provide a sufficient margin to ensure, with 99.0% probability, that rod adjustments will not be needed (see curve C at t=0.1). Similarly, in FIG. 5 a design target of 0.953 would be required to ensure, with 99.9% probability, that rod adjustments will not be required. The 99.9% represents the risk tolerance level of the customer for this "non-event".

Accordingly, the probability value or risk-tolerance level is used to determine the multiplier constant K that is to be multiplied by the time-dependent uncertainty σ, or $\sigma_{target} = K\sigma_{ref}$, where $\sigma_{ref}$ is the known reference uncertainty at a given point in time, which provides a prediction of the uncertainty at any point in the cycle. In either case, a customer specific or plant specific solution may be easily determined.

In most cases, determining an operating margin based on a desired predictability of meeting the operating limit may provide additional margin for greater operating flexibility and superior fuel cycle efficiency (higher than the historic design target limit of curve D). In any case, the example methodology may reflect a more knowledgeable plan for reactor operation.

Based on the revised margin calculation at 270 by processor 150, the designer can then revise plant operating parameters (280) using processor 150, either by hand (manual calculations) or using an optimization routine to determine the desired rod pattern, core flow, power level, etc. Any suggested changes may be forwarded to operators of plant 110 to change the operating conditions during the current cycle, if necessary or desired.

EXAMPLE

FIG. 6 is a graph of predicted eigenvalue versus normalized time to illustrate differences in the predicted margin as a result of simulation and the margin as determined by the example methodology herein. FIG. 6 illustrates an actual calculation of hot eigenvalue for power operation and cycle length considerations. The initial conditions where to evaluate future eigenvalue predictions at all exposure points greater than 20% into the cycle (T=0.2) with a customer provided risk-tolerance level of 75%. Therefore, the customer would want to be 75% certain of having the required reactivity (i.e., power and desired cycle length). The multiplier factor K based on this probability, taken from any statistics book, was 0.68. The known actual eigenvalue (normalized) at T=0.2 is 1.0050.

In FIG. 6, curves were generated for the nominal predicted eigenvalue and for the 75% probability of non-event eigenvalue. Because there are only seven groupings of data or data sets in this example, the illustrated curves are somewhat non-continuous in the y-axis. Also shown is a 10 point average of the 75% eigenvalue prediction, which simply smoothes the calculated results.

To generate the curves, raw dependent variable data (eigenvalue data with known bias values) at exposure points across each of seven (7) different operating cycles of plants having the closest configuration to the plant of interest were normalized. The normalized data from the seven cycles was calibrated to T=0.2, and the data then was aligned so that there was a data point for each of the seven eigenvalue data sets between 0.0 to 1.0 at 0.02 increments. The time-dependent bias and uncertainty values were calculated at each 0.02 increment from the seven eigenvalue data sets.

In FIG. 6, the bias value at T=0.4 was calculated at −0.0015 and the uncertainty value at T=0.4 was calculated at 0.0012. Accordingly, the predicted eigenvalue at T=0.4 is 1.0050−0.0015=1.0035. The eigenvalue at the 75% probability is determined by first multiplying the uncertainty by K, thus 0.0012*0.68=0.0008, then adding this to the predicted eigenvalue of 1.0035 to provide a more conservative prediction of 1.0043 at T=0.4, as shown in FIG. 6.

Therefore, the above example shows the desired off-line simulation hot eigenvalue for a customer that desires to be 75% certain of having the required exposure dependent reactivity (i.e. power and desired cycle length).

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A method of determining an operating margin to a given operating limit in a nuclear reactor, comprising:
    accessing operational plant data during a current operating cycle from an on-line nuclear reactor plant to be evaluated,
    simulating reactor operation off-line using the operational plant data to generate simulation results including predicted dependent variable data representative of the given operating limit,
    normalizing the predicted dependent variable data for evaluation with normalized historical dependent variable data stored from each of a plurality of operating cycles of nuclear reactor plants having a similar plant configuration to the reactor plant being evaluated,
    determining a time-dependent average bias value for the predicted dependent variable data using the normalized historical dependent variable data,
    determining a time-dependent uncertainty value for the predicted dependent variable data using the normalized historical dependent variable data,
    obtaining a risk-tolerance level for the plant being evaluated related to a probability of an event not occurring during a given period in the current operating cycle, and
    calculating an operating margin to the given operating limit based on the determined time-dependent average bias value and time-dependent uncertainty value so as to satisfy the risk-tolerance level of the evaluated plant.

2. The method of claim 1, wherein accessing operational data further includes
    retrieving plant operating conditions representing independent variables and monitored thermal limit data representing actual dependent variable data at one or more exposure points in the current operating cycle, and
    storing the independent variables and actual dependent variable data in a database.

3. The method of claim 2, wherein the independent variables are selected from the group consisting of reactor power level, core flow rate, rod pattern, control blade sequence, mechanical conditions, cycle exposure, enrichment properties, and gadolinium properties.

4. The method of claim 1, wherein the given operating limit is one of a thermal limit selected from the group consisting of a Maximum Fraction of Limiting Power Density (MFLPD) limit, a Maximum Average Planar Linear Heat Generation Rate (MAPLHGR) limit, a Maximum Fraction of Limiting Critical Power Ratio (MFLCPR) limit, a power-related limit such as an eigenvalue for the evaluated plant, and other industry-standard, power-related plant limits or thermal limits on nuclear fuel.

5. The method of claim 2, wherein simulating reactor operation off-line includes
    creating a simulator input file which models the plant being evaluated using the independent variables for simulating reactor operation in an off-line simulation program, and
    executing the off-line simulation program to generate the predicted dependent variable data representing the given operating limit.

6. The method of claim 1, wherein
    a bias value for the historical dependent variable data stored from each of the operating cycles at a plurality of exposure points in each of the respective operating cycles has been calculated in advance, the bias value at a given exposure point in a given stored operating cycle representing a difference between the measured and the predicted operating limit at that exposure point for a given historical cycle, and
    determining the time-dependent average bias value for the predicted dependent variable data includes:
        calibrating the normalized historical dependent variable data to force the bias values for the historical dependent variable data to a current exposure point in the operating cycle of the reactor plant being evaluated, and
        determining the time-dependent average bias value as an average of all the bias values of the normalized historical dependent variable data at each of the exposure points in each of the stored operating cycles, as calibrated from the current exposure point in the operating cycle of the reactor plant being evaluated.

7. The method of claim 6, wherein determining the time-dependent uncertainty value for the predicted dependent variable data includes determining a standard deviation of each of the bias values of the historical dependent variable data at each of the exposure.

8. The method of claim 1, further comprising:
    determining revised plant operating parameters based on the calculated operating margin for the given operating limit, and
    changing plant operational conditions of the on-line reactor based on the revised plant operating parameters.

9. The method of claim 8, wherein the revised plant operating parameters are determined using a method selected from the group consisting of manually and using an optimization algorithm using the calculated operating margin.

10. The method of claim 1, wherein the calculation of the operating margin for the given operating limit is repeated continuously or at a given periodicity.

11. The method of claim 1, wherein the historical dependent variable data is filtered to incorporate historical dependent variable data from similar plant operation styles to the plant being evaluated.

12. The method of claim 1, wherein the historical dependent variable data is correlated by a method selected from the group consisting of least squares and neural networks.

* * * * *